United States Patent
Morisawa (10) Patent No.: US 7,330,987 B2
(45) Date of Patent: Feb. 12, 2008

(54) SYSTEM FOR CONTROLLING POWER OF AN ELECTRONIC DEVICE BASED ON A TYPE OF POWER SOURCE BEING USED AND A TYPE OF NETWORK BEING CONNECTED TO

(75) Inventor: Toshikazu Morisawa, Tokorazawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 666 days.

(21) Appl. No.: 10/819,210

(22) Filed: Apr. 7, 2004

(65) Prior Publication Data

US 2004/0268162 A1 Dec. 30, 2004

(30) Foreign Application Priority Data

Jun. 30, 2003 (JP) ............................. 2003-188703

(51) Int. Cl.
*G06F 1/32* (2006.01)
(52) U.S. Cl. ...................................... 713/321; 713/340
(58) Field of Classification Search ................ 713/321, 713/340
See application file for complete search history.

(56) References Cited

U.S. PATENT DOCUMENTS

| | | | | |
|---|---|---|---|---|
| 5,752,046 A | * | 5/1998 | Oprescu et al. ............. | 713/300 |
| 6,266,776 B1 | * | 7/2001 | Sakai ......................... | 713/300 |
| 6,618,814 B1 | * | 9/2003 | Gaur et al. ................. | 713/323 |
| 6,772,353 B2 | * | 8/2004 | Konaka et al. ............. | 713/300 |
| 2002/0026594 A1 | * | 2/2002 | Hayashi et al. ............. | 713/300 |
| 2004/0203989 A1 | * | 10/2004 | Karaoguz ................... | 455/522 |

FOREIGN PATENT DOCUMENTS

JP 5-233551 9/1993

* cited by examiner

*Primary Examiner*—Thuan Du
(74) *Attorney, Agent, or Firm*—Pillsbury Winthrop Shaw Pittman, LLP (57) ABSTRACT

An electronic apparatus having the plurality of components, includes a storage section configured to store a plurality of power control profiles each defining different control information for executing power control with respect to each of the plurality of components, an environment determining section configured to determine at least each kind of currently applying power and network, a profile select section configured to select one of the plurality of power control profiles stored in the storage section based on a result determined by the environment determining section, and a power control section configured to execute power control based on control information defined in the power control profile selected by the profile select section.

13 Claims, 6 Drawing Sheets

| LAN | WLAN | WWAN | GPS | AC or DC | PM Profile | Proc. Speed | Monitor Bright | Turn off Mon | Turn off HDD | System Standby | System Hibernate |
|---|---|---|---|---|---|---|---|---|---|---|---|
| X | – | – | – | AC | #1 | Full | Bright | 30 Min. | Never | Never | 1 Hour |
| – | X | – | – | AC | #2 | High | Bright | 30 Min. | Never | Never | 1 Hour |
| – | – | – | – | AC | #3 | High | Bright | 30 Min. | Never | Never | 1 Hour |
| X | – | – | – | DC | #4 | High | Semi-Bright | 10 Min. | 5 Min. | 30 Min. | 1 Hour |
| – | X | – | – | DC | #5 | High | Semi-Bright | 10 Min. | 5 Min. | 30 Min. | 1 Hour |
| – | – | – | – | DC | #6 | Low | Semi-Bright | 10 Min. | 5 Min. | 30 Min. | 1 Hour |
| – | X | – | – | DC | #7 | Low | Automatic | 3 Min. | 3 Min. | 10 Min. | 20 Min. |
| – | – | X | – | DC | #8 | Low | Automatic | 3 Min. | 3 Min. | 5 Min. | 30 Min. |
| – | – | – | X | DC | #9 | Low | Automatic | 3 Min. | 3 Min. | 5 Min. | 10 Min. |

1: LAN connection is made indoor (on desk in office, etc.)
2: Wireless LAN connection is made (conference room, etc.)
3: Electronic apparatus is driven in the indoor (e.g., customer's conference room, etc.) other than above
4: Conference incapable of using AC power although wireless JAN connection is possible
5: Office incapable of using AC power although wireless LAN connection is possible
6: Indoors other than user's company
7: WiFi-ZONE (Hot Spot, etc.)
8: Electronic apparatus is being connected to wireless WAN outdoor
9: Outdoors capable of specifying position of electronic apparatus by GPS

Peak shift control

Setting for peak shift time

Setting for term
Start July 1    End September 30

Setting for battery charge stop time zone
Start 11:00    End 17:00

Setting for battery operation time zone
Start 13:00    End 16:00

Battery operable residual capacity 10 [%]

☐ Invalidate peak shift control

Version information

Import
Export
Cancel

SYSTEM FOR CONTROLLING POWER OF AN ELECTRONIC DEVICE BASED ON A TYPE OF POWER SOURCE BEING USED AND A TYPE OF NETWORK BEING CONNECTED TO

CROSS-REFERENCE TO RELATED APPLICATIONS

This application is based upon and claims the benefit of priority from prior Japanese Patent Application No. 2003-188703, filed Jun. 30, 2003, the entire contents of which are incorporated herein by reference.

BACKGROUND OF THE INVENTION

1. Field of the Invention

The present invention relates to an electronic apparatus having a plurality of power control target components, and a power control method thereof.

2. Description of the Related Art

Recently, electronic apparatuses such as personal computers have been increasingly miniaturized and lightened. The electronic apparatuses are used in a state of being placed on the desk in the office, and in addition, frequently carried in the place where users go out.

In general, when the use of AC power (supply) is possible, power is sufficiently supplied to the electronic apparatus; therefore, the electronic apparatus can perform the function at the maximum. On the other hand, the electronic apparatus depends on battery drive under the condition of incapable of using AC power, for example, in vehicles and cars during movement. However, it is hard to say that the battery has satisfactory available environment for a long term. For this reason, various power saving techniques have been proposed in the field of the mobile (portable) type electronic apparatus.

For example, Jpn. Pat. Appln. KOKAI Publication No. 5-233551 proposes the technique of realizing a power saving operation in battery drive and a high performance operation in AC power drive.

According to the foregoing technique, changeover is automatically made between the power save operation by battery drive and the high performance operation by AC power drive in accordance with the connection of an AC adapter.

However, according to the technique disclosed in the document, two operation modes are merely changed over taking only connection of the AC adapter into consideration. For example, only single power save control set previously is realized in battery drive. For this reason, there is a problem that it is impossible to provide fine power save control adaptable to various available environments of the electronic apparatus.

BRIEF SUMMARY OF THE INVENTION

Embodiments of the present invention may provide an electronic apparatus and a power control method, capable of executing fine power save control adaptable to various available environments of the electronic apparatus.

According to one aspect of the present invention, there is provided an electronic apparatus having the plurality of components, comprising a storage section configured to store a plurality of power control profiles each defining different control information for executing power control with respect to each of the plurality of components; an environment determining section configured to determine at least each kind of currently applying power and network; a profile select section configured to select one of the plurality of power control profiles stored in the storage section based on a result determined by the environment determining section; and a power control section configured to execute power control based on control information defined in the power control profile selected by the profile select section.

According to another aspect of the present invention, there is provided a power control method applied to an electronic apparatus having a plurality of components, comprising storing a plurality of power control profiles each defining different control information for executing power control with respect to each of the plurality of components in a storage medium; determining at least each kind of currently applying power and network; selecting one of the plurality of power control profiles stored in the storage medium based on a result of the determination; and executing power control based on control information defined in the selected power control profile.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

Figure 1:
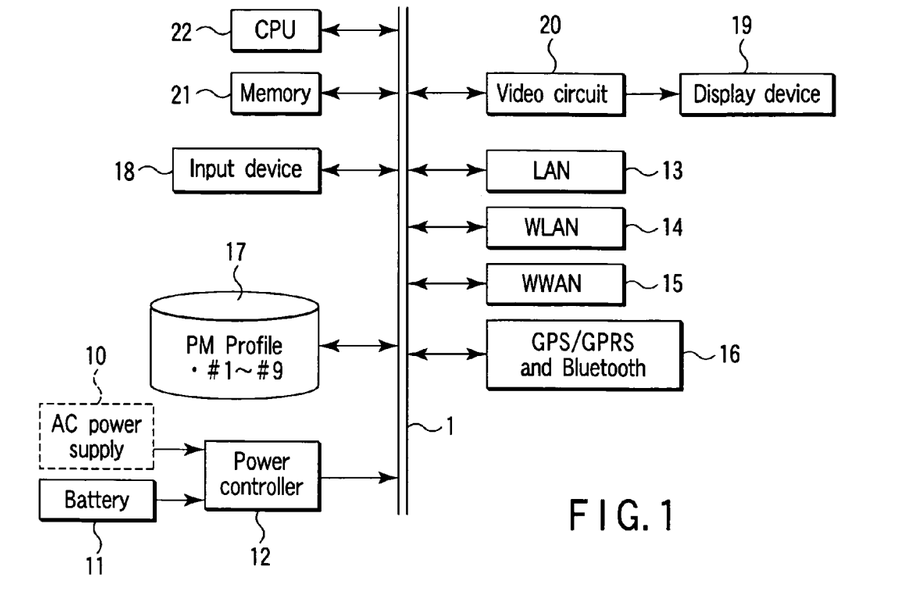
FIG. 1 is a block diagram showing the configuration of an electronic apparatus according to one embodiment of the present invention.

FIG. 1 is a block diagram showing the configuration of an electronic apparatus according to one embodiment of the present invention.

The electronic apparatus is a personal computer (PC), for example, and has a plurality of power control target components. The electronic apparatus includes bus 1, battery 11, power controller 12, control sections 13 to 16, storage medium 17, input device 18, display device (monitor) 19, video circuit 20, memory 21, CPU 22, etc. The reference numeral 13 denotes a local area network (LAN) control section, and 14 denotes a wireless LAN (WLAN) control section. The reference numeral 15 denotes a wireless wide area network (WWAN) control section, and 16 denotes a global positioning system/general packet radio system (GPS/GPRS) and Bluetooth™ control section. The electronic apparatus is externally supplied with the power of an AC power (supply) 10.

The bus 1 connects various components constituting the electronic apparatus, and is used as the medium for making data exchange between these components.

The battery 11 is a rechargeable cell built in the electronic apparatus, and chargeable when the AC power 10 is supplied to the electronic apparatus.

The power controller 12 supplies necessary power to various components included in the electronic apparatus based on the power of the AC power 10 or battery 11.

The LAN control section 13 functions the interface between the electronic apparatus body and LAN.

The WLAN control section 14 functions the interface between the electronic apparatus body and WLAN.

The WWAN control section 15 functions the interface between the electronic apparatus body and WWAN.

The GPS/GPRS and Bluetooth control section 16 includes GPS, GPRS and Bluetooth control sections. The GPS control section has a GPS function of acquiring a position of the electronic apparatus using satellite and ground control station. The GPRS control section has a function of receiving packet switching data service based on GSM by a general packet radio system to acquire a position of the electronic apparatus. The Bluetooth control section has a function of acquiring a position of the electronic apparatus by wireless communication based on the Bluetooth specification.

The storage medium 17 is a hard disk drive, for example, and stores a plurality of power control profiles (profiles #1 to #9). The profiles define different control information for executing individual power controls with respect to each of the plurality of components. Data stored in the storage medium 17 is loaded to the memory 21 as the need arises.

The input device 18 is equivalent to keyboard and mouse, and used for editing and setting data on a screen of the display device.

The display device (monitor) 19 is a liquid crystal display (LCD), and displays various setup screens and the schedule note (personal plan table) according to data supplied from the video circuit 20.

The video circuit 20 outputs data stored in the storage medium 17 and data inputted via the input device 18 to display device under the control by the CPU 22.

The memory 21 is a random access memory (RAM) used as a work area of the CPU 22, and stores an operating system (OS) executed by the CPU 22, various applications driver, data, etc.

The CPU 22 is a processor for controlling the whole operation of the electronic apparatus, and executes various programs.

Figure 2:
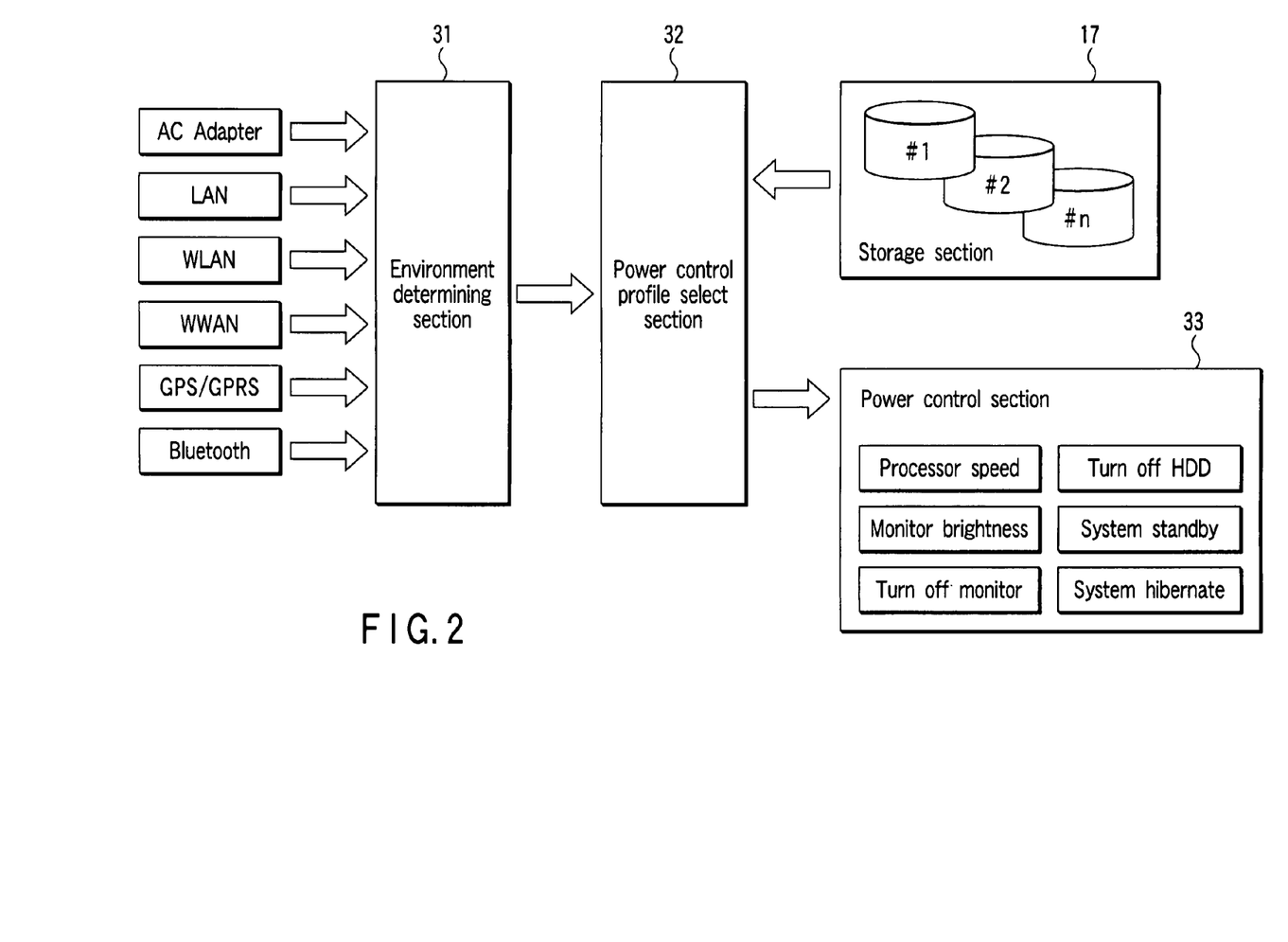
FIG. 2 is a view showing the functional configuration for realizing power control.

FIG. 2 is a view showing the functional configuration for realizing power control in the embodiment.

In FIG. 2, there are shown available environment determining section 31, power control profile select section 32 and power control section 33. These sections 31 to 33 are realized according to power control applications and utility programs stored in the memory 21.

The environment determining section 31 determines the kind of currently applying power (which of AC power 10 and battery (DC power) 11 is used) via the power controller 12 (or AC adapter). The environment determining section 31 further determines the kind of current applying network (which of LAN, WLAN or WWAN is connected/used) via LAN, WLAN and WWAN control sections 13 to 15. The environment determining section 31 further acquires and determines the use/disuse of GPS function and the position of the electronic apparatus.

The power control profile select section 32 selects one of the plurality of power control profiles (profiles #1 to #9) stored in the storage medium 17 based on the determination result made by the environment determining section 31.

The power control section 33 executes power control based on the control information defined in the power control profile selected by the power control profile select section 32. In this case, the following control information items (a) to (f) are defined in the power control profile:

(a) Speed of the CPU 22;
(b) Brightness of the display device (monitor) 19;
(c) Wait time until the power supply to the display device 19 is stopped;
(d) Wait time until the power supply to the hard disk drive is stopped;
(e) Wait time until system standby is executed; and
(f) Wait time until system hibernate is executed.

Figure 3:
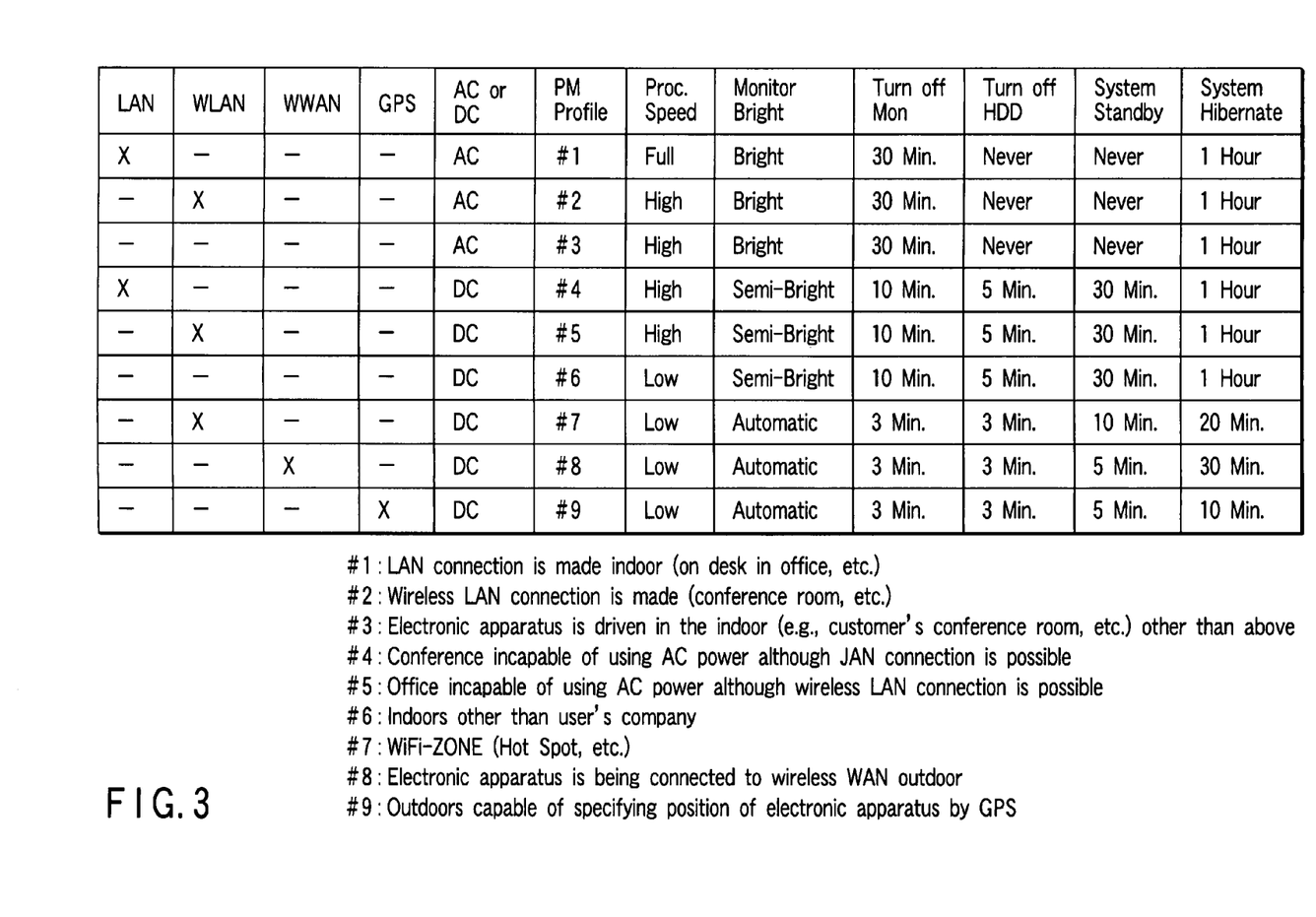
FIG. 3 is a table to explain the difference between individual power control profiles (profiles #1 to #9) determined in accordance with the available environment of the electronic apparatus.

FIG. 3 is a table to explain the difference between individual power control profiles (profiles #1 to #9) determined in accordance with the available environment of the electronic apparatus.

As shown in FIG. 3, the corresponding power control profile (any of profiles #1 to #9) is determined in accordance with the environment. The environment includes the following information items:

(i) whether the electronic apparatus is being connected to which of "LAN", "WLAN" or "WWAN";
(ii) whether the position obtained from "GPS" is within a predetermined range; and
(iii) which of AC power DC power is being used.

Based on the environment described above, the corresponding power control profile is determined. Thereafter, the corresponding power control is executed according to various control information items (foregoing control information items (a) to (f)) defined in the power control profile.

According to the table shown in FIG. 3, the profile #1 is applied to the case where the electronic apparatus uses AC power in the indoor (on the desk in the office), and being connected to LAN.

The profile #2 is applied to the case where the electronic apparatus uses AC power in the indoor (conference room), and being connected to wireless LAN.

The profile #3 is applied to the case where the electronic apparatus is driven using AC power in the indoor (customer's conference room) without using LAN or wireless LAN.

The profile #4 is applied to the case where the electronic apparatus is driven in a conference room incapable of using AC power is not used although LAN connection is possible.

The profile #5 is applied to the case where the electronic apparatus is driven in an office incapable of using AC power is not used although wireless LAN connection is possible.

The profile #6 is applied to the case where the electronic apparatus is driven in the indoor other than for user's company.

The profile #7 is applied to the case where the electronic apparatus is driven in a WiFi zone.

The profile #8 is applied to the case where the electronic apparatus is connected to wireless WAN outdoors.

The profile #9 is applied to the case where the electronic apparatus is driven in the outdoors capable of specifying the position of the electronic apparatus by GPS.

The profiles #6 and #9 (which do not use AC power) are not specified from their network connection state; however, they are specified by positional information acquired via GPS, GPRS and Bluetooth device.

Figure 4:
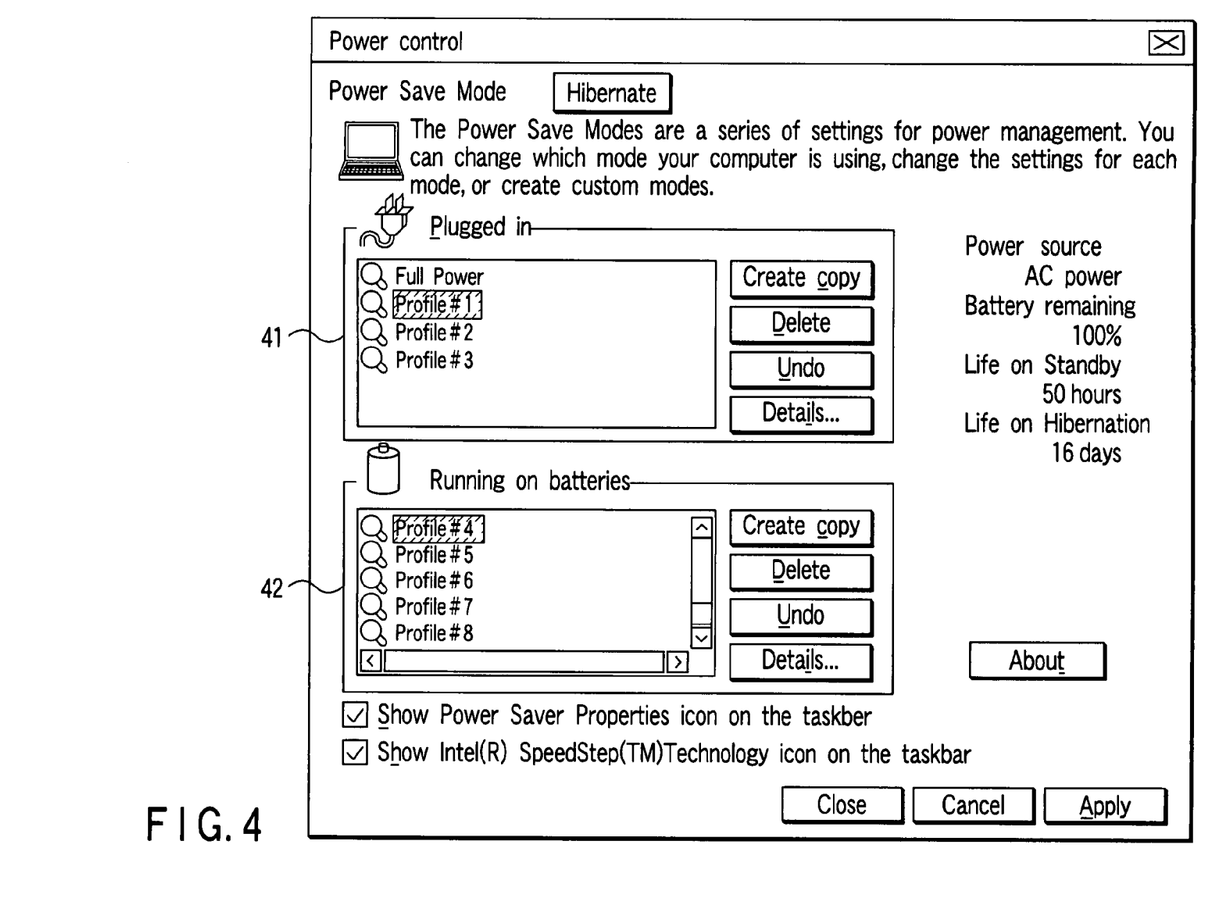
FIG. 4 is a view showing a screen for setting the power control profile.

FIG. 4 is a view showing a screen for setting the power control profile.

As illustrated in FIG. 4, the screen is provided with two setting areas. One is a setting area 41 for setting a profile group, which should be applied during the use of AC power. Another is a setting area 42 for setting a profile group, which should be applied during the use of DC power (battery).

Individual profiles shown in each setting area are deleted and copied, and thereby, a new profile can be created. Individual control information items defined in each profile are edited to change setting values.

Figure 5:
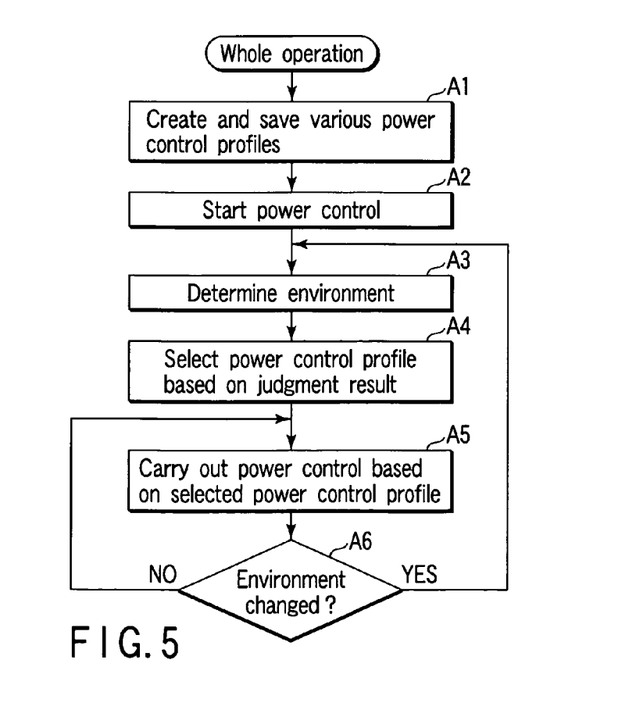
FIG. 5 is a flowchart to explain the entire operation of the power control.

The operation of power control in the electronic apparatus will be explained below with reference to FIG. 5.

Various power control profiles are created on the screen of the display device 19 via the input device 18, and thereafter, previously saved in the storage medium 17 (step A1).

The CPU 22 starts power control using power control application/utility program stored in the memory 21 (step A2).

The environment determining section 31 included in the foregoing program determines the environment based on the following information items (step A3). One is the kind of currently applying power (which of AC power 10 and battery (DC power) 11 is used). Another is the kind of current applying network (which of LAN, WLAN or WWAN is connected/used). Another is the use/disuse of GPS function and the position of the electronic apparatus.

The power control profile select section 32 selects one of the plurality of power control profiles (profiles #1 to #9) stored in the storage medium 17 based on the determination result made by the environment determining section 31 (step A4).

The power control section 33 executes power control based on control information defined in the power control profile selected by the power control profile select section 32 (step A5).

Thereafter, the environment determining section determines whether or not the environment of the electronic apparatus has a change (step A6). If the environment has no change, the processing of step A5 is carried on. On the other hand, if the environment has a change, the processing of the foregoing steps A3 to A5 are repeated.

Figure 6:
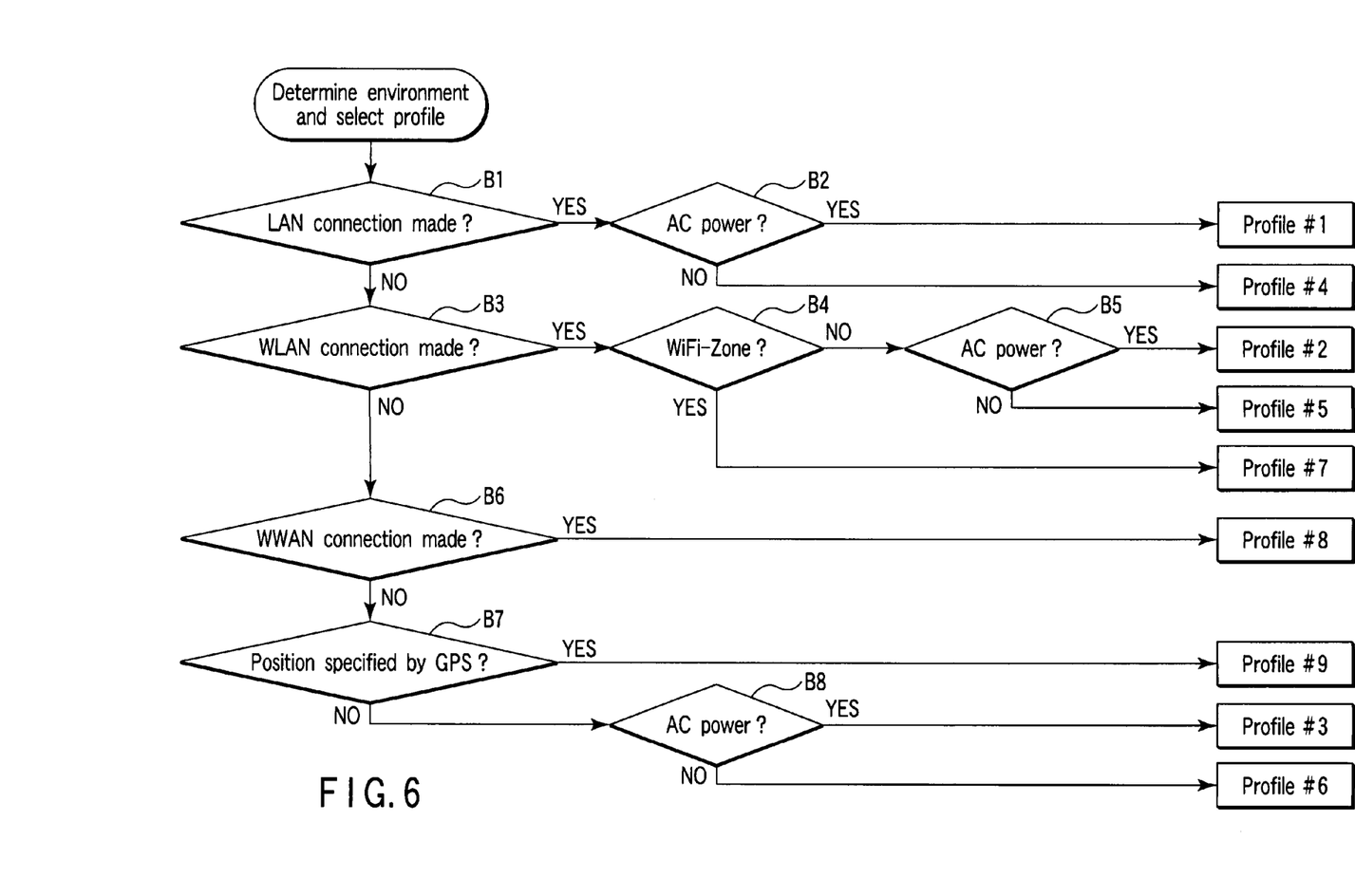
FIG. 6 is a flowchart to explain the determination of available environment and the detailed operation to select power control profiles.

The operation for determining environment and selecting power control profile will be explained in detail below with reference to FIG. 6.

In order to determine the environment, it is determined whether or not the electronic apparatus is connected to LAN (step B1). If LAN connection is made, it is determined whether or not AC power is used (step B2). If the AC power is used, the profile #1 is selected. On the other hand, if the AC power is not used (battery is used), the profile #1 is selected.

In step B1, if LAN connection is not made, it is determined whether or not WLAN connection is made (step B3). If WLAN connection is made, it is determined whether or not the position of the electronic apparatus is within a WiFi zone (step B4). If the position is not within the WiFi zone, it is determined whether or not AC power is used (step B5). If AC power is used, the profile #2 is selected. On the other hand, if AC power is not used (battery is used), the profile #5 is selected. In step B4, if the position is within the WiFi zone, the profile #7 is selected.

In step B3, if WLAN connection is not made, it is determined whether or not WWAN connection is made (step B6). If the WWAN connection is made, the profile #8 is selected.

In step B6, if WWAN connection is not made, it is determined whether or not the position of the electronic apparatus is specified by GPS (step B7). If the position of the electronic apparatus is specified, the profile #9 is selected.

In step B7, if the position of the electronic apparatus is not specified, it is determined whether or not AC power is used (step B8). If the AC power is used, the profile #3 is selected. On the other hand, if the AC power is not used (battery is used), the profile #6 is selected.

Figure 7:
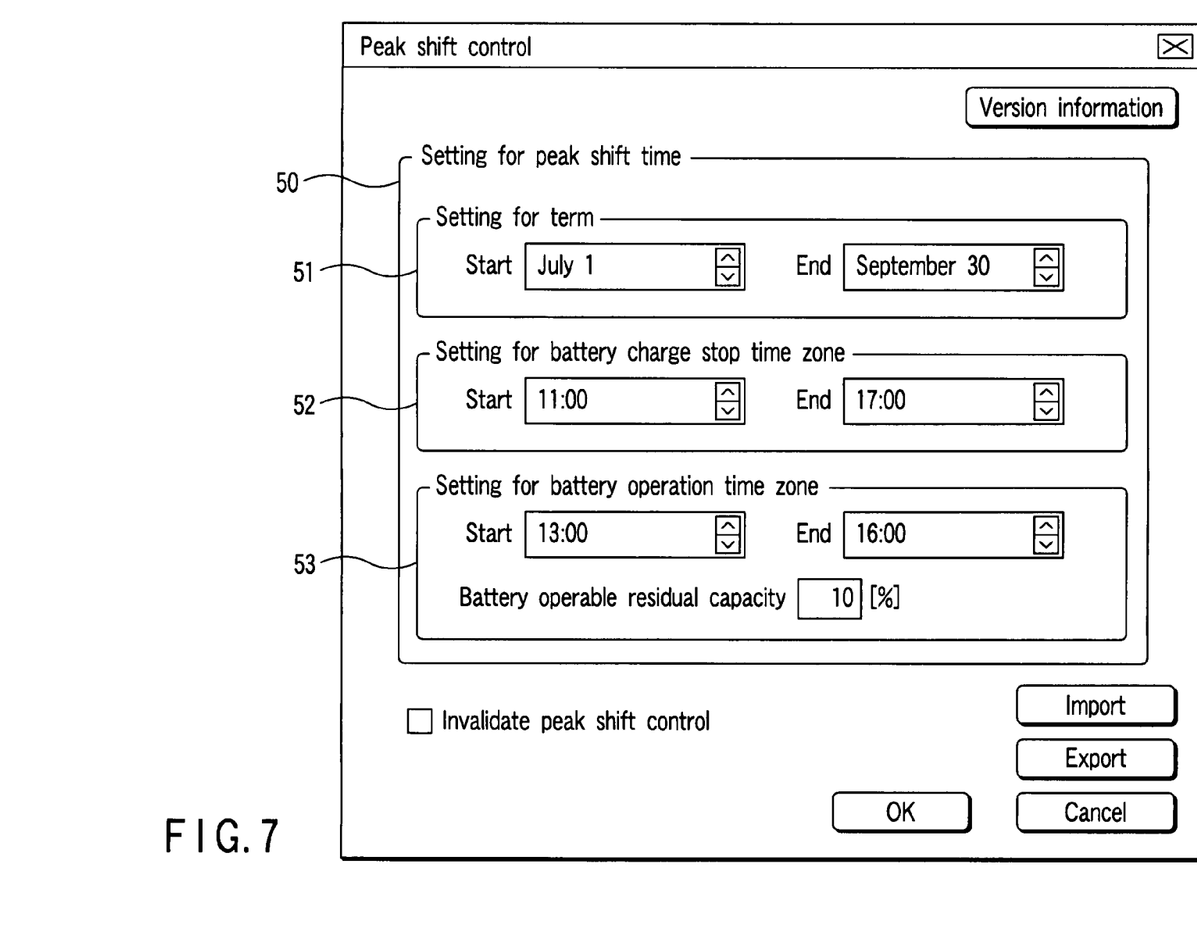
FIG. 7 is a view showing one example of a screen for setting peak shift control.

The electronic apparatus of the embodiment has a power management function referred to as a peak shift control function. The peak shift control is realized according to application or utility program stored in the memory 21. The peak shift control function means the following power management function. According to the power management function, when power consumption peak time zone (in particular, daytime 13:00 p.m. to 16:00 p.m. in summer) comes, the supply from AC power is automatically stopped. Thereafter, the electronic apparatus is driven using a battery storing power so far as power source. FIG. 7 shows one example of a screen for setting the peak shift control.

As seen from FIG. 7, the screen is provided with an area 50 for setting peak shift time. The area 50 has the following three sub-areas 51 to 53. The sub-area 51 is used for setting the period of peak shift control. The sub-area 52 is sued for setting a time zone stopping battery charge. The sub-area 53 is used for setting a battery-operating time zone (i.e., time zone inhibiting the use of AC power).

Data set in the foregoing sub-areas 51 to 53 may be built up when it is determined whether or not the electronic apparatus is using AC power. For example, in the processing of step B2, B5 and B8 (judgment whether or not Ac power is used), determination may be made using the data set in the sub-areas 51 to 53. By doing so, it is possible to realize suitable power control linking with the peak shift control.

According to the embodiment, power control is not changed over taking only connection of AC adapter into consideration, but network connection state and the positional information by GPS or the like are considered. Therefore, it is possible to execute fine power control with respect to individual components constituting the electronic apparatus.

According to the present invention, it is possible to execute fine power save control adaptable to various available environments of the electronic apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus having a plurality of components, comprising:
   a storage section configured to store a plurality of power control profiles each defining different control information for executing power control with respect to each of the plurality of components;
   an environment determining section configured to determine at least a type of power source being used by the electronic apparatus and a type of network the electronic apparatus is being connected to;

a profile select section configured to select one of the plurality of power control profiles stored in the storage section based on a result determined by the environment determining section; and a power control section configured to execute power control based on control information defined in the power control profile selected by the profile select section.

2. The apparatus according to claim 1, wherein the environment determining section determines whether the type of network the electronic apparatus is being connected to is any of LAN, WLAN or WWAN.

3. The apparatus according to claim 1, further comprising a position acquisition section configured to acquire a position of the electronic apparatus, wherein the environment determining section makes the determination using the position acquired by the position acquisition section.

4. The apparatus according to claim 3, wherein the environment determining section acquires the position using at least one of GPS, GPRS and Bluetooth device.

5. The apparatus according to claim 1, wherein the control information defined in the plurality of power control profiles includes control information items for controlling at least a processor, display device and hard disk drive.

6. The apparatus according to claim 1, wherein the control information defined in the plurality of power control profiles includes control information items for controlling at least wait time until system standby is executed and wait time until system hibernate is executed.

7. A power control method applied to an electronic apparatus having a plurality of components, comprising:

storing a plurality of power control profiles each defining different control information for executing power control with respect to each of the plurality of components in a storage medium;

determining at least a type of power source being used by the electronic apparatus and a type of network the electronic apparatus is being connected to;

selecting one of the plurality of power control profiles stored in the storage medium based on a result of the determination; and executing power control based on control information defined in the selected power control profile.

8. The method according to claim 7, further comprising acquiring a position of the electronic apparatus, wherein the determination is made using the acquired position.

9. The method according to claim 8, wherein the position is acquired using at least one of GPS, GPRS and Bluetooth device.

10. The method according to claim 7, wherein the control information defined in the plurality of power control profiles includes control information items for controlling at least a processor, display device and hard disk drive.

11. The method according to claim 7, wherein the control information defined in the plurality of power control profiles includes control information items for controlling at least wait time until system standby is executed and wait time until system hibernate is executed.

12. The method according to claim 7, wherein the control information items defined in the plurality of power control profiles stored in the storage medium are individually editable via a setting screen.

13. The method according to claim 7, wherein the type of power source being used by the electronic apparatus is determined based on setting information indicative of a time zone inhibiting use of AC power.

* * * * *